July 16, 1940.  H. L. MEYER  2,207,929

HOLDER FOR BIFOCAL LENS BLANKS

Filed Oct. 31, 1938

INVENTOR,
Henry L. Meyer.
BY Hovey & Hamilton,
ATTORNEYS.

Patented July 16, 1940

2,207,929

UNITED STATES PATENT OFFICE 2,207,929

HOLDER FOR BIFOCAL LENS BLANKS

Henry L. Meyer, Kansas City, Mo.

Application October 31, 1938, Serial No. 237,877

4 Claims. (Cl. 49—14)

This invention relates to improvements in a holder for bifocal lens blanks adapted to secure in the proper relative relation, the major and minor lens during the fusing operation thereof.

The principal object of the present invention is the provision of a holder for the two circular lenses of a bifocal blank whereby they are held in the proper relation during the fusing operation without any portion of the holder being positioned therebetween.

Another object of this invention is the provision of a holder for bifocal lens blanks including a unitary structure that is carried by the major lens and supports the outer marginal edge of the minor lens above and outside the marginal edge of the major lens.

Further objects are simplicity and economy of construction, relative adjustability of the parts, and ease and efficiency of operation.

Other objects and advantages of the holder will appear during the course of the following specification, wherein reference is had to the drawing in which.

Figure 1:
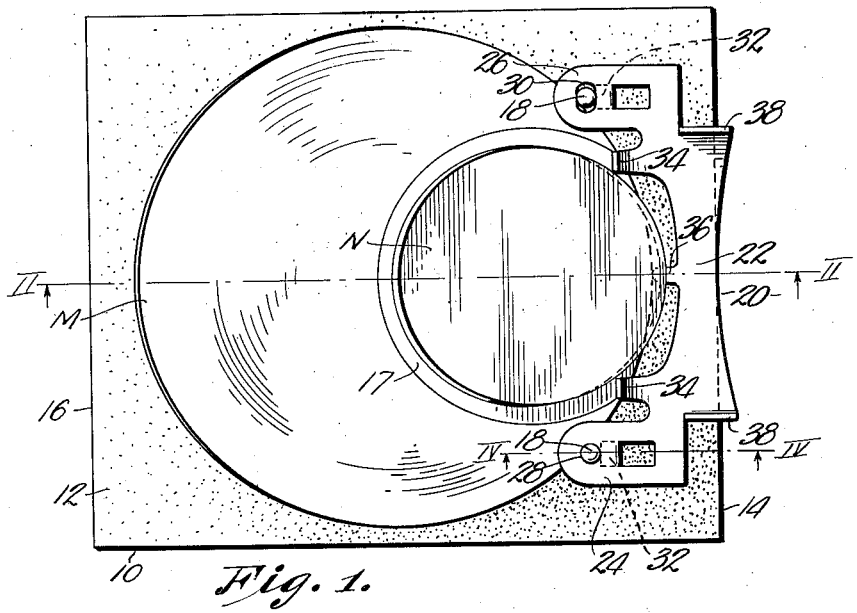
Figure 1 is a plan view of a holder for a bifocal lens blank with the major and minor lenses in position, embodying this invention.

Throughout the several views like reference characters refer to similar parts, and the numeral 10 designates a base block of refractory material, or any other suitable material that will withstand the high temperature required during the fusing operation.

Figure 2:
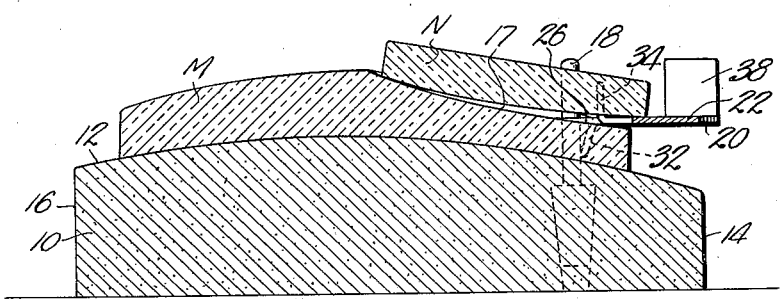
Fig. 2 is a vertical, central section taken on line II—II of Fig. 1, with the lenses separated.
Figure 3:
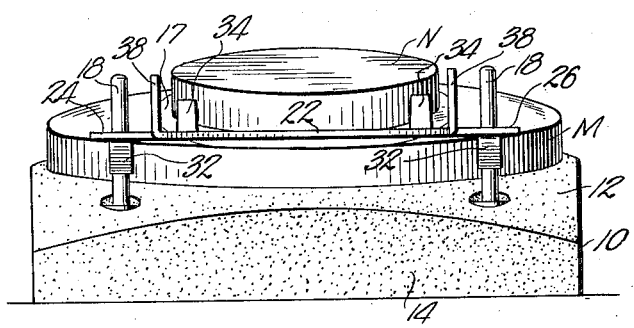
Fig. 3 is an end view of the assembly shown in Fig. 2.

The top surface 12 of block 10 is shaped to conform to the shape of the major lens M, to be positioned thereon for the purpose of maintaining the proper general form of the finished product. Generally this surface is a spherical section that extends to all edges of the block and is adapted to receive the major lens blank in any position thereon. To conserve space in the furnace and for convenience of operation, the block in plan view, is made rectangular as shown. The end 14 of block 10 is thinner than its opposite end 16, thereby providing the desired inclination of the major and minor lenses during the fusing operation when they are positioned as shown in Fig. 2. Major lens M is countersunk or recessed at its one side at 17 to receive the minor lens N in overlapped relation as shown.

Prior to this invention it has been common practice to place the adjacent edges of the major and minor lenses in tangential relation and to space them apart as is necessary to eliminate the objectional bubbles from forming between the lenses during the fusing operation, by means of wedges interposed between the lens members. In other cases, lugs have been formed on the outside periphery of the lens button to serve as support members. The first method of breaking the wedge from between the lens members, leaves an objectionable scar, and the second method involves considerable expense and extra adjustment to get the proper relation of the lenses. The contemplated invention, however, obviates these objections in that the circular lens members may be used without any additions thereto and without interposing wedges therebetween.

The minor lens N is usually made of flint glass that has a refractory index different from that of crown glass of the major lens M, and is ground on its one surface to conform to the recess 17 formed in M.

The major lens M is secured in position on block 10 by means of vertically disposed stop pins 18, rigidly secured in spaced apart relation in block 10. These stop pins are adapted to contact the periphery of the major lens and to extend thereabove. They are also positioned adjacent the thin edge 14 of the block 10 and on a line parallel thereto so that the general inclination of the major lens is toward the pins 18, thereby causing said lens to hug the pins.

It is the purpose to position the minor lens with its center point on a line drawn perpendicular to the center of the straight line joining the center points of said pins, thus making it necessary to position the center of the recess 17 in the major lens on the same line so that the lenses will properly register during the fusing operation.

In order to maintain the minor lens N in its proper position to lens M, the following plate member 20 is provided.

Body 22 of plate member 20 is preferably planar and made of a suitable material that will withstand the glass fusing heat and will retain its form. Forwardly projecting ears 24 and 26 are provided with openings 28 and 30 respectively. The opening 28 is of a size to allow a free sliding motion but substantially no transverse motion of the plate member 20 when placed as shown in Fig. 1. The hole 30 is elongated in alignment with the center line of the holes, but is of a width substantially equal to the diameter of pin 18. This elongated hole 30 permits of slight differences in the center distances between pins 18 and also allows for a slight vertical adjustment of either end on member 20.

Figure 4:
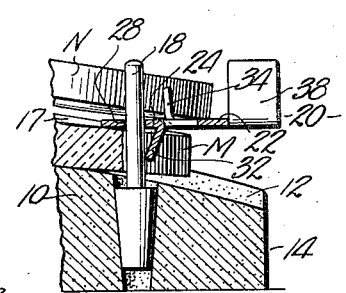
Fig. 4 is an enlarged section taken on line IV—IV of Fig. 1.

In order to maintain plate member 20 in a plane substantially perpendicular to pins 18, detents 32 struck out from the body of plate 20, are formed downwardly to rest against the outside portion of the respective pins 18, as clearly shown in Fig. 4. This structure has many advantages over a continuous sleeve opening in that the plate 20 is more easily positioned by first contacting the pins 18 with the detents 32 and then moving it downwardly to position, also it is possible to rock the member 20 on the pins 18 to move the detents 32 away from the post during the positioning of the plate member.

When plate 20 is positioned on pins 18 and the major lens is in the operative position, a portion of the ears 24 and 26 will rest on top of the major lens to support plate 20 in the operative position, perpendicular to pins 18. Adjacent each of the ears 24 and 26 is an upwardly and outwardly projecting stop 34 formed integral with the plate member 20 and adapted to engage the peripheral edge of the minor lens N when it is in the operative position on the major lens M. When the lenses are thus positioned, the minor lens will overhang the major lens, as clearly shown in Fig. 2, thereby serving as a ledge for supporting the one side of the minor lens on a tongue 36 extending forwardly from the center portion of plate 20. This tongue is spaced apart from the outer edges of and does not contact the major lens, but serves to support the minor lens above the major lens with its diametrically opposite edge resting on the major lens as shown.

This positioning of the lenses as stated above, is very essential in order to prevent formation of bubbles between the lens members during the fusing operation. The angle between the two lenses may be easily varied by simply bending tongue 36 upwardly or downwardly from the plane of the planar body 22.

To facilitate positioning of plate member 20, it is provided with two upturned tongues 38 which may be easily gripped by the operator. These tongues are spaced inwardly from the outer ends of member 20 to allow sufficient room for the fingers so that they will not interfere with the adjacent lense assemblies.

In the operation of this device, the major lens M is positioned on the base block 10 with the depression 17 in on the major center line thereof, as described above, and with its peripheral edge resting against both stop pins 18. The plate member is next positioned on the pins 18 to be supported by the major lens. The minor lens N is then positioned with its one edge resting on tongue 36 and its opposite edge resting on the major lens. This assembly is then passed through a furnace in the usual manner and the lens members will be fused together to form a bifocal lens blank. Since the tongue 36 is not interposed between the lenses, it may be easily removed without any fracturing or scaring of the major lens.

As the glass begins to soften during the fusing operation, the action of gravity will cause the minor lens to gradually move to the bottom of recess 17 so that the lens surfaces progressively contact, thus forcing the air bubbles tending to form therebetween, to the outer edge. The minor lens N may stay down over the tongue 36 to some degree, however, this will not interfere with its easy removal when the fusing operation is completed.

Having thus described the invention, what is claimed as new and desire to be secured by Letters Patent is:

1. A holder for bifocal lens blanks comprising a major lens supporting block having a pair of spaced apart pins extending vertically therefrom, to engage the periphery of and center a major lens supported on said block; means including an elongated member to be fitted on said posts with a portion thereof resting on said major lens and having a minor lens supporting tongue adjacent the center portion of said elongated member spaced outwardly from the periphery of the major lens, and members integral with said elongated member to engage and position said minor lens with a segment thereof extending beyond the periphery of the major lens to rest on said supporting tongue.

2. A holder for bifocal lens blanks comprising a major lens supporting block having a pair of spaced apart pins extending vertically therefrom, to engage the periphery of and center a major lens supported on said block; means including an elongated member to be fitted on said posts with a portion thereof resting on said major lens and having a minor lens supporting tongue adjacent the center portion of said member and spaced outwardly from the periphery of the major lens, and members integral with said elongated member to engage and position said minor lens with a segment thereof extending beyond the periphery of the major lens to rest on said supporting tongue, said elongated member having upturned, spaced apart tongues to be engaged by the operator to position said member.

3. A holder for bifocal lens blanks comprising a major lens supporting block having a pair of spaced apart pins extending vertically therefrom, to engage the periphery of and center a major lens supported on said block; a sheet metal member having openings formed through its opposite ends through which said pins are projected; and, a pressed down tongue adjacent each of said openings to engage the side of said pins to position said member substantially perpendicular thereto, and also having minor lens centering and supporting means whereby a segment of the minor lens projects beyond the periphery of the major lens and is supported thereabove.

4. A holder for bifocal lens blanks comprising a major lens supporting block having a pair of spaced apart, vertically disposed pins extending therefrom to engage the periphery of the major lens and position it on said block; a sheet metal member formed to fit over said pins with its extremities resting on the major lens and having a downturned tongue adjacent each of said pins to rest thereagainst and support the sheet metal member in a substantially horizontal position; spaced apart stops carried by said sheet metal member between said pins to engage and position a minor lens on said major lens; and a tongue integral with said sheet metal member intermediate said stops and positioned outside the periphery of said major lens to support one edge of said minor lens above said major lens.

HENRY L. MEYER.